April 4, 1939.  E. W. RUSCHER  2,153,343
GAS METER MANIFOLD
Filed Jan. 6, 1938
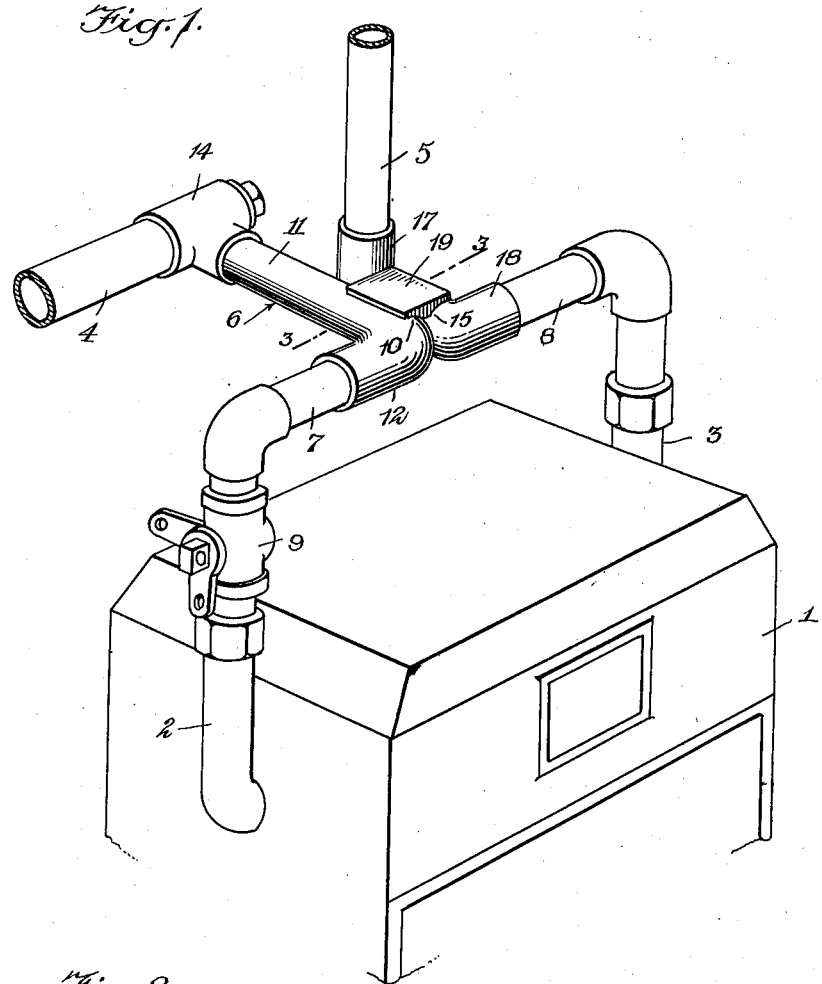
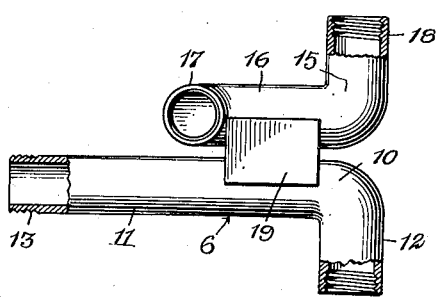
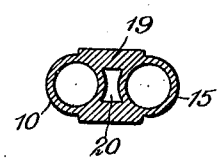
INVENTOR
Ernest W. Ruscher
BY
Anderson & Liddy
ATTORNEYS Patented Apr. 4, 1939

2,153,343

UNITED STATES PATENT OFFICE 2,153,343

GAS METER MANIFOLD

Ernest W. Ruscher, New York, N. Y.

Application January 6, 1938, Serial No. 183,691

3 Claims. (Cl. 285—3)

This invention relates to an improved gas meter manifold and has for an object to provide a construction which not only guides gas into the meter and from the meter but also acts as a support for holding the meter in the desired position.

Another object of the invention is to provide a manifold to be used with meters which register the consumption of artificial gas and the like wherein the construction acts as means for automatically preventing fraudulent use of gas or tampering with pipes leading to the meter.

A further and more specific object of the invention is to provide a manifold which may be connected with a supply pipe and a house pipe and to a standard meter in such a way as to readily support the meter and, at the same time, permit gas to flow into the meter and from the meter into the house pipes.

In the accompanying drawing—

Fig. 1 is a perspective view of a manifold disclosing an embodiment of the invention, the same being shown in connection with a standard meter and supply of outlet pipes;

Fig. 2 is a plan view of the manifold shown in Fig. 1, certain parts being broken away to better illustrate the construction;

Fig. 3 is a fragmentary sectional view through Fig. 1 approximately on the line 3—3.

Referring to the accompanying drawing by numerals, 1 indicates a standard meter designed to measure artificial gas or the like. Meters of this kind are in common use and are provided with an inlet pipe section 2 and an outlet pipe section 3. Associated with the meter 1 is a supply pipe 4 which supplies gas from the gas main of the street. Also associated with the meter 1 is a house pipe 5 which extends upwardly into the house for directing gas to the various outlets in the house.

The manifold 6 is connected to the pipes 4 and 5 and also through suitable connecting pipes 7 and 8 to the inlet and outlet pipes 2 and 3 of the meter. A standard valve 9 is arranged in the pipe connection 7 so that the gas may be turned off at this point whenever desired. With the connections as shown in Fig. 1, it will be readily seen that the pipes 4 and 5 act to support the meter 1 while, at the same time, permitting gas to flow into the meter and flow therefrom. The manifold 6 is preferably a casing though it could be made of several parts and connected together rigidly so as to function as shown in Fig. 1.

When forming the manifold it is provided with an L-shaped tubular member 10 having a long leg 11 and a short leg 12. The leg 11 is provided with exterior threads 13 which are screwed into a T 14 connected with the pipe 5. The short leg 12 receives the threaded end of pipe 7. Associated with the tubular member 10 is a second tubular member 15 which has a straight central section 16 parallel to the long leg 11 and end extensions 17 and 18 which project at right angles to each other and to the section 16 as clearly shown in Figs. 1 and 2. Extension 18 receives the threaded end of pipe 8, while extension 17 receives the threaded end of the house pipe 5.

The connector 19 is formed into two parts, as shown in Fig. 3, namely, an upper and a lower part, and these parts are cast integral with the section 16 and leg 11. This connector or bridge not only connects the tubular members together but also connects them together in spaced relation whereby there is provided a space or opening 20 between the respective tubular members. This is important in that it prevents any one from fraudulently drilling a hole from one tubular member to the other and plugging the outside aperture. An action of this kind would permit the gas to flow from pipe 4 to pipe 5 without passing through the meter 1. By providing the space 20 this can not be done.

By the provision of the manifold 6 a simple and strong construction is presented which eliminates any of the usual supporting devices for the meter 1 and permits the meter to be placed substantially at any desired point as the entire support for the meter is from above.

I claim:

1. A gas meter supporting manifold comprising an L-shaped tubular member, a second tubular member having a section extending in one plane and extensions at each end of said section, said extensions extending in planes at right angles to each other and to said section, and a connector for connecting said tubular members, said section being parallel with one leg of said L-shaped tubular member and said connector being positioned to connect the last mentioned leg and said section in spaced relation with a space open to the atmosphere therebetween.

2. A one-piece meter manifold acting to support a meter and as means for directing gas into and out of the meter, said manifold being provided with a substantially L-shaped supporting tubular inlet member adapted to be connected to a gas supply pipe, a supporting tubular outlet member adapted to be connected to a gas discharge pipe leading to a point of utilization and a bridge integral with said inlet and outlet members, said bridge spacing said inlet and outlet members while rigidly securing them together, said spacing being sufficient to present an opening therebetween which is continually open to the atmosphere.

3. A support for a gas meter comprising a substantially hollow L-shaped member removably secured at one end to a gas supply pipe and at the other end with a gas meter, a second tubular member having a body positioned parallel to one leg of said L-shaped member, an end portion near the inlet end of said L-shaped member extending at right angles to said body and removably secured to a house pipe and a second end portion extending at right angles to said body in a plane at right angles to the first-mentioned end portion, said second end portion being connected to a meter, and means integral with both of said tubular members for rigidly securing said body to said L-shaped member in spaced relation therewith, said body and said L-shaped member having a passageway therebetween open continually to the atmosphere.

ERNEST W. RUSCHER.